(12) United States Patent
Yu et al.

(10) Patent No.: US 11,308,825 B2
(45) Date of Patent: Apr. 19, 2022

(54) ANTI-COUNTERFEIT LABEL AND MANUFACTURING METHOD THEREFOR

(71) Applicant: Chi Yu, Shandong (CN)

(72) Inventors: Chi Yu, Shandong (CN); Puze Yu, Shandong (CN)

(73) Assignee: Chi Yu, Shandong (CN)

( * ) Notice: Subject to any disclaimer, the term of this patent is extended or adjusted under 35 U.S.C. 154(b) by 1068 days.

(21) Appl. No.: 15/747,050

(22) PCT Filed: Jul. 15, 2016

(86) PCT No.: PCT/CN2016/090086
§ 371 (c)(1),
(2) Date: Nov. 6, 2018

(87) PCT Pub. No.: WO2017/016396
PCT Pub. Date: Feb. 2, 2017

(65) Prior Publication Data
US 2019/0066542 A1 Feb. 28, 2019

(30) Foreign Application Priority Data

Jul. 27, 2015 (CN) .......................... 201510445095.2

(51) Int. Cl.
*B32B 41/00* (2006.01)
*G09F 3/00* (2006.01)
(Continued)

(52) U.S. Cl.
CPC .............. *G09F 3/0292* (2013.01); *B32B 3/30* (2013.01); *B32B 27/10* (2013.01);
(Continued)

(58) Field of Classification Search
CPC . G09F 3/0292; G09F 3/03; G09F 3/02; G09F 2003/0277; G09F 2003/028;
(Continued)

(56) References Cited

U.S. PATENT DOCUMENTS 2,129,363 A 9/1938 Simons
3,887,742 A 6/1975 Reinnagel
(Continued)

FOREIGN PATENT DOCUMENTS

CN 2403094 Y 10/2000
CN 2535881 2/2003
(Continued)

OTHER PUBLICATIONS

Written Opinion of the International Searching Authority for International Application No. PCT/CN2016/090086; State Intellectual Property Office of the P.R. China; Beijing, China; dated Sep. 19, 2016.
(Continued)

*Primary Examiner* — Michael N Orlando
*Assistant Examiner* — Joshel Rivera
(74) *Attorney, Agent, or Firm* — Thomas E. Lees, LLC

(57) ABSTRACT

An anti-counterfeit label and a manufacturing method therefor. The anti-counterfeit label is provided with a bottom plate (1). Ink bags (2) filled with anti-counterfeit ink are disposed on the bottom plate (1). More than two ink bags (2) are arranged to form an anti-counterfeit pattern. A cover plate (3) is disposed at upper parts of the ink bags (2). The thickness of the bottom plate (1) is 0.2 to 2.0 mm. The depths of the ink bags (2) on the bottom plate (1) are 0.019 to 1.99 mm, The cover plate (3) adopts a plastic film cover plate, the thickness of the cover plate (3) being greater than 0.0001 mm. After the cover plate (3) of the anti-counterfeit label is destroyed, partial or integral information about the label will disappear within a period of time, thereby resolving the problems of high anti-counterfeit cost and complicated query means, and effectively preventing counterfeiters from counterfeiting in batches by using second-hand product packing.

2 Claims, 1 Drawing Sheet

(51) Int. Cl.
 C09D 11/50 (2014.01)
 G09F 3/02 (2006.01)
 G09F 3/03 (2006.01)
 B32B 37/00 (2006.01)
 B32B 3/30 (2006.01)
 B32B 27/10 (2006.01)
 B41M 3/14 (2006.01)

(52) U.S. Cl.
 CPC ...... *B32B 37/0038* (2013.01); *B32B 37/0076* (2013.01); *B41M 3/14* (2013.01); *C09D 11/50* (2013.01); *G09F 3/02* (2013.01); *G09F 3/03* (2013.01); *B32B 2250/02* (2013.01); *B32B 2255/12* (2013.01); *B32B 2255/26* (2013.01); *B32B 2260/028* (2013.01); *B32B 2260/046* (2013.01); *B32B 2307/31* (2013.01); *B32B 2307/4023* (2013.01); *B32B 2307/75* (2013.01); *B32B 2419/00* (2013.01); *B32B 2425/00* (2013.01); *B32B 2519/00* (2013.01); *G09F 2003/028* (2013.01); *G09F 2003/0277* (2013.01)

(58) Field of Classification Search
 CPC ... B32B 37/0076; B32B 37/0038; B32B 3/30; B32B 27/10; B32B 2307/4023; B32B 2260/028; B32B 2307/75; B32B 2425/00; B32B 2307/31; B32B 2419/00; B32B 2255/12; B32B 2260/046; B32B 2255/26; B32B 2250/02; B32B 2519/00; B41M 3/14; C09D 11/50
 USPC .................. 156/60, 64, 350, 351, 378, 379
 See application file for complete search history.

(56) References Cited

U.S. PATENT DOCUMENTS

| | | | |
|---|---|---|---|
| 5,204,160 | A | 4/1993 | Rouser |
| 5,699,326 | A | 12/1997 | Haas |
| 6,328,342 | B1 * | 12/2001 | Belousov ......... G06K 19/06046 283/91 |

FOREIGN PATENT DOCUMENTS

| | | |
|---|---|---|
| CN | 200986777 Y | 12/2007 |
| CN | 201232771 Y | 5/2009 |
| CN | 201281910 | 7/2009 |
| CN | 201281910 Y | 7/2009 |
| CN | 102254481 | 11/2011 |
| CN | 202523312 U | 11/2012 |
| CN | 104575249 | 4/2015 |
| CN | 104966463 | 10/2015 |
| JP | S62280886 | 12/1987 |
| JP | S62280886 A | 12/1987 |
| JP | P2002-36711 A | 2/2002 |
| JP | P2012-32771 A | 2/2012 |

OTHER PUBLICATIONS

International Search Report for corresponding PCT application PCT/CN2016/090086, dated Sep. 19, 2016.
Extended European Search Report dated Mar. 22, 2019.
Chinese first Office action and search report for Chinese Patent Application No. 201510445095.2; China National ntellectual Property Administration; Beijing, China; dated Jan. 26, 2016.
Korean first Office action for Korean Patent Application No. 10-2018-7004822; Korean Intellectual Property Office Patent Office; Daejeon, Republic of Korea; dated May 20, 2019.
Japanese first Office action for Japanese Patent Application No. 2018-522839; Japan Patent Office; Tokyo, Japan dated Dec. 4, 2018.

* cited by examiner

ANTI-COUNTERFEIT LABEL AND MANUFACTURING METHOD THEREFOR

This application is a 371 application of PCT/CN2016/090086, filed Jul. 15, 2016, which claims priority to and benefit of Chinese Application No. 201510445095.2, filed Jul. 27, 2015, the disclosures of which are hereby incorporated herein by reference in their entirety.

CROSS REFERENCE TO RELATED APPLICATIONS

The present invention relates to field of anti-counterfeit technology, in particular, to an anti-counterfeit label that can disappear automatically when identification period has elapsed, has a good anti-counterfeit effect, can work stably and is suitable for large scale popularization and application, and a method for manufacturing the anti-counterfeit label.

BACKGROUND

The conventional anti-counterfeit methods mainly include: chemical oil anti-counterfeit, digital anti-counterfeit (SMS anti-counterfeit, telephone service anti-counterfeit), optical anti-counterfeit, barcode anti-counterfeit, two-dimensional code anti-counterfeit, RF anti-counterfeit, and the like. In the chemical oil anti-counterfeit, it is achieved by visual inspection, and thus it has large limitation. Counterfeiters may acquire counterfeit information directly from visual colour of the oil and manufacture counterfeits. When the counterfeits cannot be identified by visual inspection, the anti-counterfeit results cannot be obtained timely from manufacturers. The digital anti-counterfeit is achieved by query through SMS or telephone service. Customers can find several numerals on a label or a package of a product and can send short message to a query platform for a merchant or call query platform to query the several numerals to determine authenticity of the product. However, such method is complicated for users, in particular, the customers may often input wrong information or input information at a low speed when he inputs information by a keyboard, which is adverse for convenient and quick query. The two-dimensional code anti-counterfeit is an orientation or information query technology which appears in recent years. It mainly employs a personal computer terminal, i.e., a cell phone, for a two-dimensional code pattern, to recognize two-dimensional code information by use of scanning software installed in the cell phone and upload the two-dimensional code information to a website of a merchant to query and obtain reply information containing the price, the place of origin and so on for a production. However, in such method, the two-dimensional code pattern for one product category has been fixed. Thus, counterfeiters can copy and print the pattern easily. Since its information is constant in a batch of products, it is very easy for counterfeiters to manufacture counterfeits on a large scale. Furthermore, this method needs to certify at multiple times, and it is impossible to ensure a purchaser being the first one which has certified the product. Moreover, the query rate is also reduced. The barcode anti-counterfeit has a principle and mechanism similar to that of the two-dimensional code query and thus it also cannot prevent counterfeiters from manufacturing counterfeits in a large scale.

Presently, the RF anti-counterfeit technology is a relatively advanced anti-counterfeit technology. It uses a RF label on a product as a carrier for reading data and reads information of the product by a professional reading device. The technology means that a special identification card which is unique for and cannot be copied is provided for each product. This technology has the following disadvantages: the cost of manufacturers can increase; the anti-counterfeit chip is expensive; in query, customers have to use professional RF reading code device, which is very expensive, and sometimes, customers have to use devices of a merchant in the neighbourhood of a supermarket or a retailer and thus it cannot become a popular anti-counterfeit technology.

BRIEF SUMMARY

In order to alleviate the above defects and shortcoming in the prior art, the present invention proposes an anti-counterfeit label that can disappear automatically when identification period has elapsed, has a good anti-counterfeit effect, can work stably and is suitable for large scale popularization and application, and a method for manufacturing the anti-counterfeit label.

The present invention may be achieved by the following means:

An anti-counterfeit label, characterized in that it comprises a bottom plate in which ink cavities are provided, the ink cavities being filled with anti-counterfeit ink, wherein two or more ink cavities are arranged to form an anti-counterfeit pattern, and a cover plate is arranged on top of the ink cavities, and wherein the bottom plate has a thickness of 0.2-2.0 mm, the ink cavities in the bottom plate each have a depth of 0.019-1.99 mm, and the cover plate is a plastic film cover plate with a thickness greater than 0.0001 mm.

In the present invention, the bottom plate is a paper bottom plate, wherein a plastic film is overlaid on the paper bottom plate and surfaces of the ink cavities after the ink cavities are formed in the paper bottom plate, and then the anti-counterfeit ink is injected into the ink cavities.

In the present invention, the anti-counterfeit ink comprises the following components: 0.6-4.0 parts by weight of sodium hydroxide, 1.6-5.0 parts by weight of Thymol Phenolphthalein, 5-80 parts by weight of glycerine, 10-200 parts by weight of ethanol, 1-100 parts by weight of ethyl ether, wherein the above parts are dosages per 100 milliliter of distilled water. In practice, the concentrations of the ethanol and the ethanol as well as capacity of the ink cavities may be adjusted to achieve the speed at which the sealed information disappears after the label is opened.

The present invention also provides a method for manufacturing the anti-counterfeit label as described above, characterized in that it comprises:

Step 1 of making a plastic film with a thickness of 0.2-2.0 mm as a bottom plate, drilling circular or square holes with a depth of 0.019-1.99 mm in the bottom plate as ink cavities, or making a paper as the bottom plate and drilling the holes and then covering the plastic film on the bottom plate and the holes to form the bottom plate and ink cavities, a plastic film with a thickness not less than 0.0001 being used as a cover plate of the ink cavities;

Step 2 of dipping the bottom plate in which ink cavities have been formed as well as the sealing cover plate into a solution of vaseline-ethyl ether in concentration of 10-80%, or coating or brushing the solution of vaseline-ethyl ether in concentration of 10-80% on the bottom plate in which ink cavities have been formed and the sealing cover plate, and drying them;

Step 3 of dipping the dried bottom plate and cover plate with vaseline into the following solution, or coating or brushing the following solution on the bottom plate and the cover plate: the solution contains 0.6-5.0 parts by weight of sodium hydroxide, 1.6-5.0 parts by weight of Thymol Phenolphthalein, 20-200 parts by weight of ethanol and 100 milliliter of distilled water, and drying the bottom plate and cover plate after dipping or coating or brushing;

Step 4 of injecting an anti-counterfeit ink into the ink cavities in the bottom plate, so that each two adjacent ink cavities form anti-counterfeit information such as fonts, alphabets, numbers, patterns and so on, the anti-counterfeit ink comprising the following components: 0.6-4.0 parts by weight of sodium hydroxide, 1.6-5.0 parts by weight of Thymol Phenolphthalein, 5-80 parts by weight of glycerine, 10-200 parts by weight of ethanol, 1-100 parts by weight of ethyl ether, wherein the above parts are dosages per 100 milliliter of distilled water;

Step 5 of integrally adhering the cover plate to the bottom plate on which information has been formed or hot pressing the cover plate on the bottom plate, so as to seal the ink in the ink cavities to form the label with anti-counterfeit label;

Step 6 of storing the anti-counterfeit information (such as fonts, alphabets, numbers, patterns) in a backup query database;

Step 7 of pasting the label on a product or package.

When the present invention is used, the customers tear the sealing cover plate and recognize and read information by cell phones. The information is uploaded to a database website and the website feeds the information back to the users. Meanwhile, the information on the label will disappear after a predetermined period (such as 3 to 5 minutes or 10 minutes). It means that a product has been sold out or consumed. If the information arises again after the predetermined period (such as 3 to 5 minutes or 10 minutes) from the time at which the first customer reads the information, the product for which the information arises again will be regarded as counterfeit. Or, all the products, which are manufactured after counterfeits made by counterfeiters based on this information have appeared twice, will be regarded as counterfeits. In other words, for the present anti-counterfeit label and the using method therefor, the counterfeiters can only make one or two counterfeit, and cannot make counterfeits in a large scale.

In comparison with the prior art, in the present invention, after the cover plate of the counterfeit label is destroyed, part or all of information of the label will disappear within a period. Such method can avoid high counterfeit costs and complicated query process, and can efficiently prevent the counterfeiters from manufacturing counterfeits in batches by use of old pack of products.

Reference sign of drawings: 1—bottom plate, 2—ink cavities, 3—cover plate.

DETAILED DESCRIPTION

Figure 1:
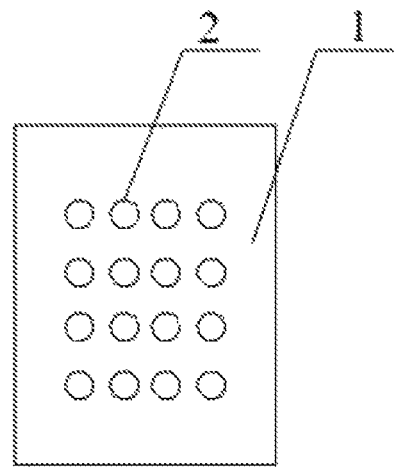
FIG. 1 is a schematic view showing a structure of a bottom plate of a counterfeit label according to an embodiment of the present invention.
Figure 2:
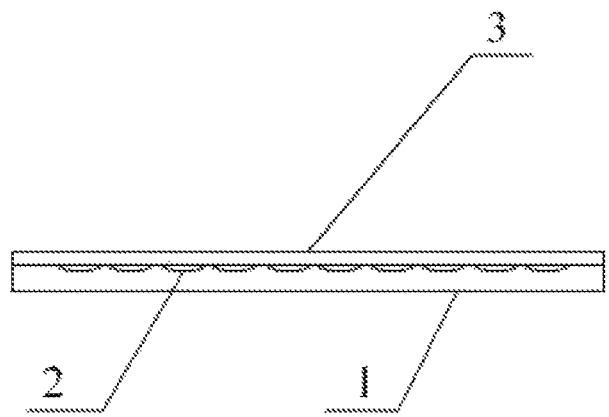
FIG. 2 is a schematic view showing a structure of the counterfeit label according to an embodiment of the present invention.

As illustrated in FIG. 1, the present invention provides an anti-counterfeit label, characterized in that it comprises a bottom plate 1 in which ink cavities 2 are provided, the ink cavity 2 being filled with anti-counterfeit ink. Two or more ink cavities 2 are arranged to form an anti-counterfeit pattern, and a cover plate 3 is arranged on top of the ink cavities 2. The bottom plate 1 has a thickness of 0.2-2.0 mm, the ink cavities 2 in the bottom plate 1 each have a depth of 0.019-1.99 mm, and the cover plate 3 is a plastic film cover plate with a thickness greater than 0.0001 mm.

In the present invention, the bottom plate 1 is a paper bottom plate. A plastic film is overlaid on the paper bottom plate 1 and surfaces of the ink cavities 2 after the ink cavities 2 are formed in the paper bottom plate 1, and then the anti-counterfeit ink is injected into the ink cavities 2.

In the present invention, the anti-counterfeit ink comprises the following components: 0.6-4.0 parts by weight of sodium hydroxide, 1.6-5.0 parts by weight of Thymol Phenolphthalein, 5-80 parts by weight of glycerine, 10-200 parts by weight of ethanol, 1-100 parts by weight of ethyl ether, wherein the above parts are dosages per 100 milliliter of distilled water. In practice, the concentrations of the ethanol and the ethanol as well as capacity of the ink cavities may be adjusted to achieve the speed at which the sealed information disappears after the label is opened.

The present invention also provides a method for manufacturing the anti-counterfeit label as described above, characterized in that it comprises:

Step 1 of making a plastic film with a thickness of 0.2-2.0 mm as a bottom plate 1, drilling circular or square holes with a depth of 0.019-1.99 mm in the bottom plate 1 as ink cavities 2, or making a paper as the bottom plate and drilling holes and then covering the plastic film on the bottom plate and the holes to form the bottom plate and ink cavities, a plastic film with a thickness not less than 0.0001 being used as a cover plate of the ink cavities;

Step 2 of dipping the bottom plate 1 in which ink cavities 2 have been formed as well as the sealing cover plate 3 into a solution of vaseline-ethyl ether in concentration of 10-80%, or coating or brushing the solution of vaseline-ethyl ether in concentration of 10-80% on the bottom plate 1 in which ink cavities 2 have been formed as well as the sealing cover plate, and drying them;

Step 3 of dipping the dried bottom plate 1 and the cover plate 3 with vaseline into the following solution, or coating or brushing the following solution on the bottom plate 1 and the cover plate 3: the solution contains 0.6-5.0 parts by weight of sodium hydroxide, 1.6-5.0 parts by weight of Thymol Phenolphthalein, 20-200 parts by weight of ethanol, as well as 100 milliliter of distilled water, and drying the bottom plate 1 and the cover plate 3 after dipping or coating or brushing;

Step 4 of injecting an anti-counterfeit ink into the ink cavities 2 of the bottom plate, such that each two adjacent ink cavities form anti-counterfeit information such as fonts, alphabets, numbers, patterns and so on, the anti-counterfeit ink comprising the following components: 0.6-4.0 parts by weight of sodium hydroxide, 1.6-5.0 parts by weight of Thymol Phenolphthalein, 5-80 parts by weight of glycerine, 10-200 parts by weight of ethanol, 1-100 parts by weight of ethyl ether, wherein the above parts are dosages per 100 milliliter of distilled water;

Step 5 of integrally adhering the cover plate 3 to the bottom plate 1 on which information has been formed or hot pressing the cover plate on the bottom plate, so as to seal the ink in the ink cavities to form a label with anti-counterfeit information;

Step 6 of storing the anti-counterfeit information (such as fonts, alphabets, numbers, patterns and so on) in a backup query database;

Step 7 of pasting the label on a product or package.

INDUSTRIAL APPLICABILITY

When the present invention is used, the customers can tear the sealing cover plate, and then recognize and read information by cell phones. The information is uploaded to a database website and the website feeds the information back to the users. Meanwhile, the information on the label will disappear after a predetermined period (such as 3 to 5 minutes or 10 minutes). It means that the product has been sold out or consumed. If the information arises again after the predetermined period (such as 3 to 5 minutes or 10 minutes) from the time when the first customer reads the information, the product for which the information arises again will be considered as counterfeit. Or, all the products, which are manufactured after counterfeits made by counterfeiters based on this information have appeared twice, will be regarded as counterfeits. In other words, for the present anti-counterfeit label and the using method therefor, the counterfeiters can only make one or two counterfeits, and cannot make counterfeits in a large scale.

What is claimed is:

1. An anti-counterfeit label, characterized in that it comprises a bottom plate 1 in which ink cavities 2 are provided, the ink cavity 2 being filled with anti-counterfeit ink, wherein two or more ink cavities 2 are arranged to form an anti-counterfeit pattern, and a cover plate 3 is arranged on top of the ink cavities 2, and wherein the bottom plate 1 has a thickness of 0.2-2.0 mm, the ink cavities 2 in the bottom plate 1 each have a depth of 0.019-1.99 mm, and the cover plate 3 is a plastic film cover plate with a thickness greater than 0.0001 mm;

the bottom plate is a paper bottom plate, wherein a plastic film is overlaid on the paper bottom plate and surfaces of the ink cavities after the ink cavities are formed in the paper bottom plate, and then the anti-counterfeit ink is injected into the ink cavities; and the anti- counterfeit ink comprises the following components: 0.6-4.0 parts by weight of sodium hydroxide, 1.6-5.0 parts by weight of Thymol Phenolphthalein, 5-80 parts by weight of glycerine, 10-200 parts by weight of ethanol, 1-100 parts by weight of ethyl ether, wherein the above parts are dosages per 100 milliliter of distilled water.

2. A method for manufacturing the anti-counterfeit label according to claim 1, characterized in that it comprises:

Step 1 of making a plastic film with a thickness of 0.2-2.0 mm as a bottom plate, drilling circular or square holes with a depth of 0.019-1.99 mm in the bottom plate as ink cavities, or making a paper as the bottom plate and drilling the holes and then covering the plastic film on the bottom plate and the holes so as to form the bottom plate and ink cavities, a plastic film with a thickness not less than 0.0001 mm being used as a cover plate of the ink cavities;

Step 2 of dipping the bottom plate in which ink cavities have been formed and the sealing cover plate into a solution of petrolatum-ethyl ether in concentration of 10-80%, or coating or brushing the solution of petrolatum-ethyl ether in concentration of 10-80% on the bottom plate in which ink cavities have been formed and the sealing cover plate, and drying them;

Step 3 of dipping the dried bottom plate and the cover plate with petrolatum into the following solution or coating or brushing the following solution on the bottom plate and the cover plate: the solution contains 0.6-5.0 parts by weight of sodium hydroxide, 1.6-5.0 parts by weight of Thymol Phenolphthalein, 20-200 parts by weight of ethanol and 100 milliliter of distilled water, and drying the bottom plate and cover plate after dipping or coating or brushing;

Step 4 of injecting an anti-counterfeit ink into the ink cavities in the bottom plate, such that each two adjacent ink cavities form anti-counterfeit information such as fonts, alphabets, numbers, patterns, the anti-counterfeit ink comprising the following components: 0.6-4.0 parts by weight of sodium hydroxide, 1.6-5.0 parts by weight of Thymol Phenolphthalein, 5-80 parts by weight of glycerine, 10-200 parts by weight of ethanol, 1-100 parts by weight of ethyl ether, wherein the above parts are dosages per 100 milliliter of distilled water;

Step 5 of integrally adhering the cover plate to the bottom plate on which information has been formed or hot pressing the cover plate on the bottom plate, so as to seal the ink in the ink cavities to form the label with anti-counterfeit information;

Step 6 of storing the anti-counterfeit information in a backup query database;

Step 7 of pasting the label on a product or package.

* * * * *